C. A. DRESSER & H. FANKBONER.
ALTERNATING CURRENT MOTOR CONTROLLER.
APPLICATION FILED JULY 2, 1909.
1,080,200.
Patented Dec. 2, 1913.
4 SHEETS—SHEET 1.
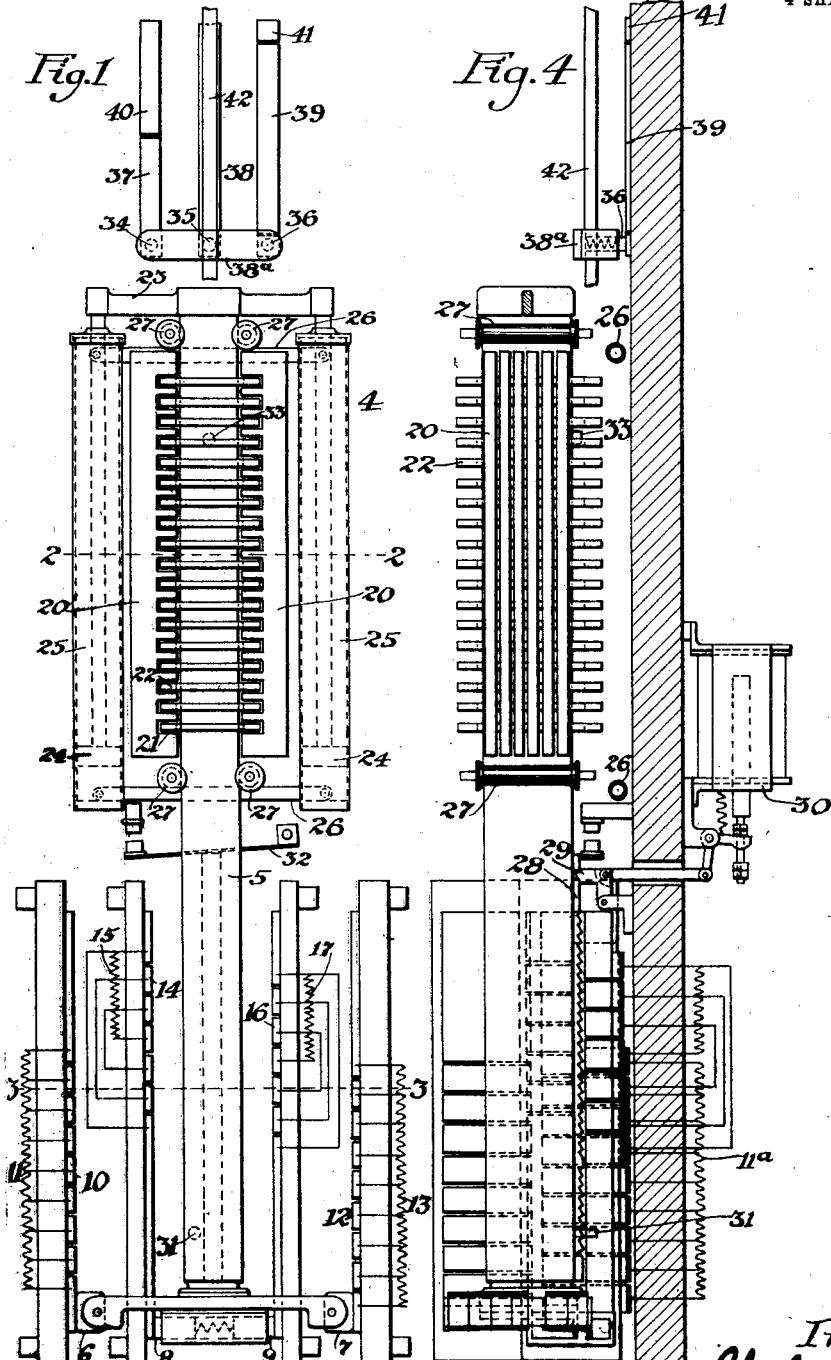

C. A. DRESSER & H. FANKBONER.
ALTERNATING CURRENT MOTOR CONTROLLER.
APPLICATION FILED JULY 2, 1909.
1,080,200.
Patented Dec. 2, 1913.
4 SHEETS—SHEET 2.
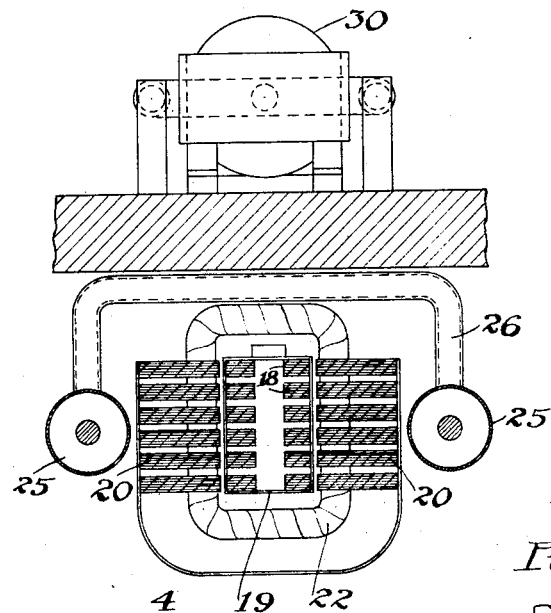
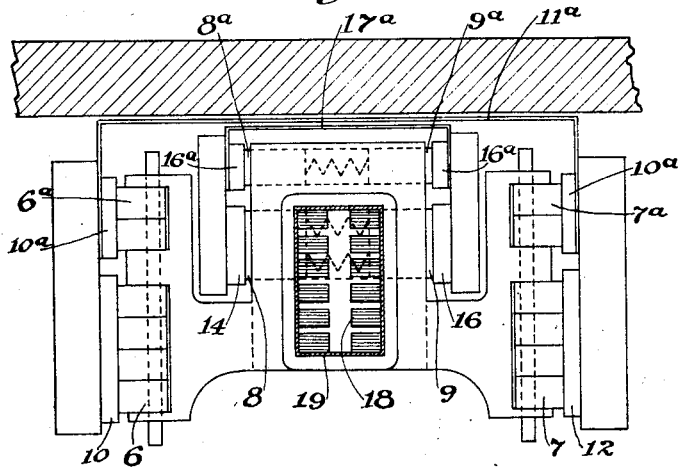
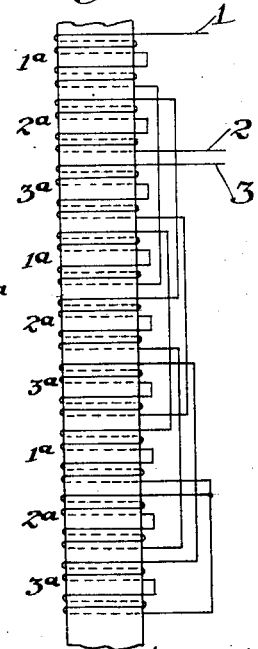
Witnesses:
Inventors
Attorneys.

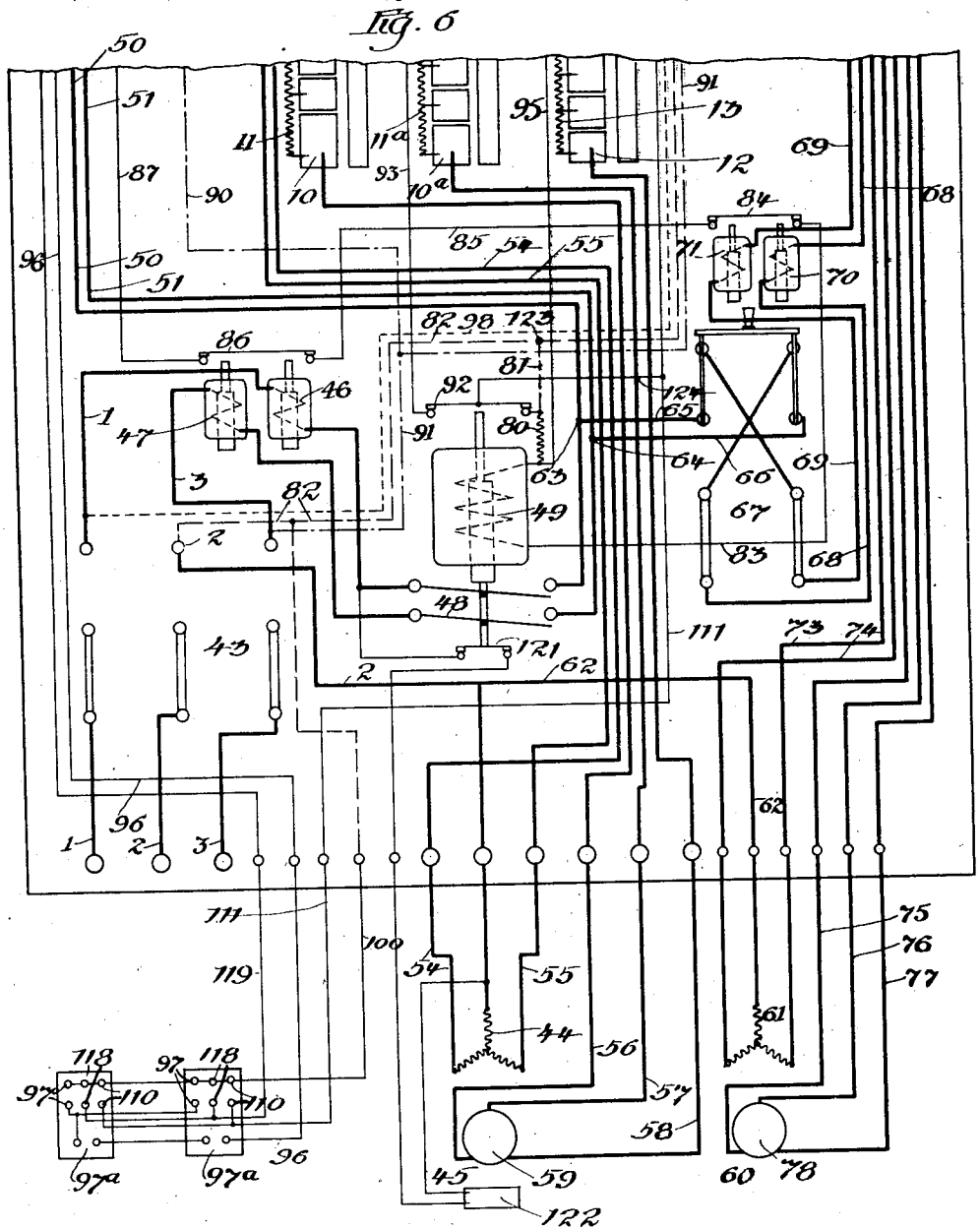

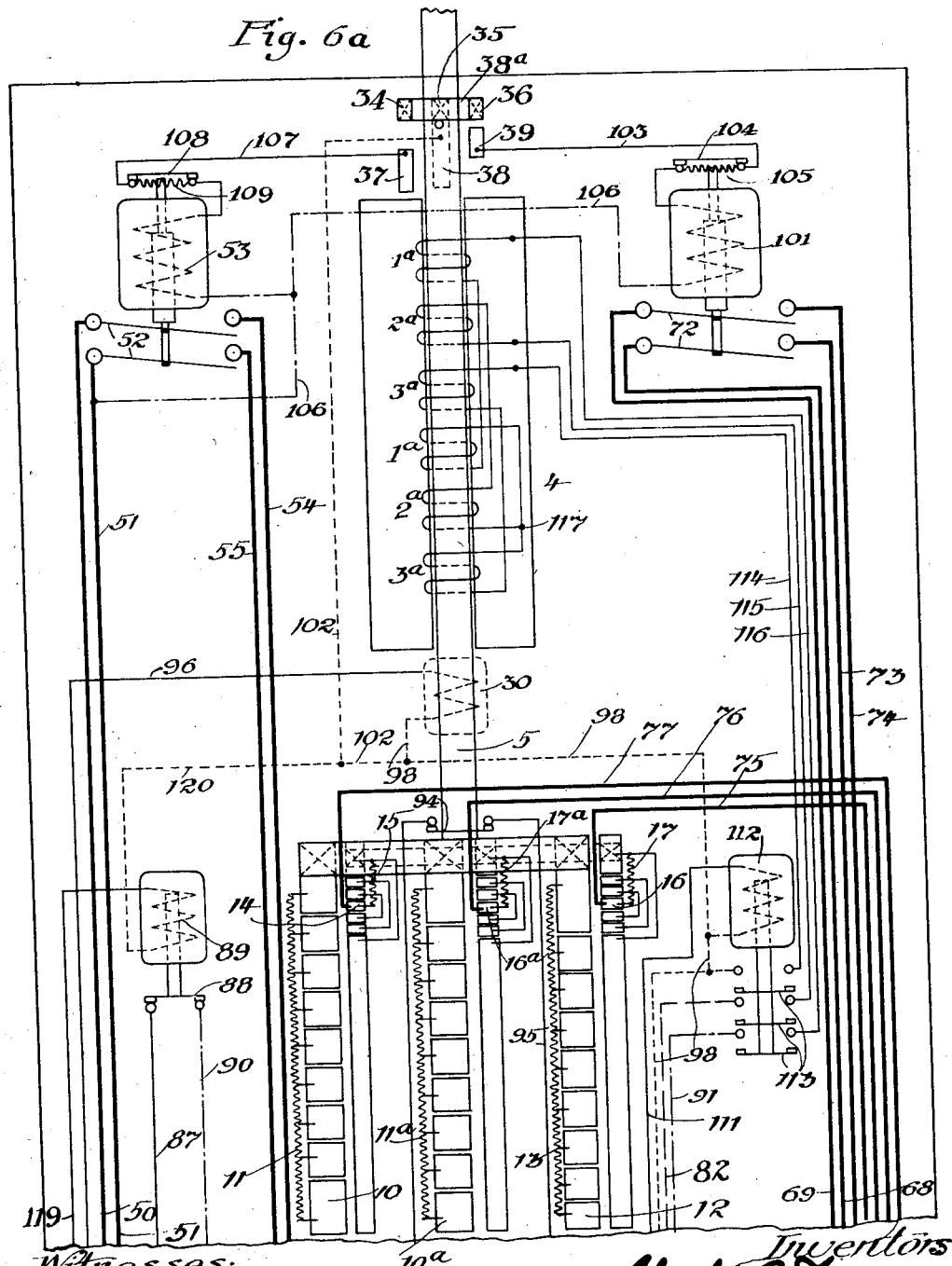

UNITED STATES PATENT OFFICE.

CHARLES A. DRESSER AND HARLAND FANKBONER, OF CHICAGO, ILLINOIS, ASSIGNORS, BY MESNE ASSIGNMENTS, TO G. A. EDWARD KOHLER, OF CHICAGO, ILLINOIS.

ALTERNATING-CURRENT-MOTOR CONTROLLER.

1,080,200.  Specification of Letters Patent.  Patented Dec. 2, 1913.

Application filed July 2, 1909. Serial No. 505,581.

*To all whom it may concern:*

Be it known that we, CHARLES A. DRESSER and HARLAND FANKBONER, citizens of the United States, residing at Chicago, in the county of Cook and State of Illinois, have invented a certain new and useful Improvement in Alternating - Current - Motor Controllers, of which the following is a specification.

This invention relates to alternating current motor controlling devices, and has for its object to provide a new and improved device of this description.

The invention is illustrated in the accompanying drawings, wherein—

Figure 1 is a front view of one form of the alternating current dominant or master controller; Fig. 2 is a sectional view taken on line 2—2 of Fig. 1; Fig. 3 is a sectional view taken on line 3—3 of Fig. 1; Fig. 4 is a longitudinal sectional view of the device shown in Fig. 1; Fig. 5 is a diagrammatic view showing one form of winding for the dominant or master controller; Figs. 6 and 6ª are diagrammatic views which, taken together, show the electrical connections for an alternating current controlling device for a plurality of motors.

Like numerals refer to like parts throughout the several figures.

This invention has among other objects the remote control of alternating current electric motors, and particularly by means of apparatus actuated by an alternating current.

It is found in practice that the control of alternating current motors by the use of an alternating current presents difficulties and requires conditions not present when a direct current is used, and that the apparatus which may be used with a direct current, cannot be successfully used for this purpose with an alternating current.

One of the objects of this invention, therefore, is to provide means and apparatus for practically and efficiently solving these difficulties and permitting the control of an electric motor or motors from a distant point by the use of an alternating current, and to further provide such means whereby an alternating current dominant or master controller may be used, and to further make such dominant or master controller automatic in action so that it may be operated from a distant point. In the particular apparatus shown this dominant or master controller is a solenoid of peculiar construction and operation, by means of which the alternating current is practically utilized in securing the desired control.

Referring now to the drawings wherein for purposes of illustration and explanation we have shown a particular construction and apparatus for carrying the invention into practice, there is illustrated a dominant or master controller comprising a solenoid 4 having a plunger 5 provided with contact brushes 6, 7, 8 and 9, which move along a series of contacts to cut electrical resistance out of and into circuit. In the particular construction illustrated, brush 6 moves along a series of electrical contacts 10, associated with the resistance 11. Brush 7 moves along a series of contacts 12, associated with the resistance 13. Brushes 6ª and 7ª move along a series of contacts 10ª having associated therewith the resistance 11ª. Brush 8 moves along a series of contacts 14 associated with the resistance 15. Brush 9 moves along a series of contacts 16 associated with the resistance 17. There are also connected with the plunger brushes 8ª and 9ª, which move along contacts 16ª, with which is associated the resistance 17ª.

The plunger 5 consists of a core preferably made up into sections 18 of laminated iron, the sections having air spaces between them to afford ventilation. The core is provided with some suitable winding. In this particular instance the core has a single winding which consists of a tube, sheath or covering 19 of magnetic material, or non-magnetic material, such as copper. It is, of course, evident that any other suitable winding can be substituted for this sheath.

Associated with the core 18 are the fields 20 which are preferably of laminated iron. These fields are preferably made up of laminated strips separated by air spaces to provide ventilation, as shown in Fig. 2. The fields are also preferably provided with slots 21 for the field coils 22. These coils extend into the slots 21 and may either surround the core or run from slot to slot in the fields parallel to the core. As illustrated in Fig. 5 these coils are arranged for a three-phase current. The coils are preferably arranged in order for the three phases, that is, the top coil, for example, would have the first phase, the second coil the second phase, and the third coil the third phase, the fourth coil having the first phase, the fifth the second phase and the sixth the third phase, etc., as shown in said Fig. 5. It is of course evident that the relative position of the coils carrying the different phases may be changed if desired. The number of coils will, of course, depend upon the amount of movement desired.

Some suitable dash pot arrangement is associated with the plunger 5. As herein shown, the upper end of the plunger is provided with a cross piece 23 to which are connected pistons 24 working in cylinders 25. These dash pots prevent the too rapid fall of the plunger. The dash pots are preferably connected at the top and bottom by the tube 26 which equalizes the pressure therein. There is also preferably provided a series of guiding rollers 27 for the plunger. The plunger is provided with a rack 28 engaged by a pawl or latch 29 controlled by the coil 30, the arrangement being such that when the coil is energized the core is released, and when the coil is deënergized the weight of the parts, or a spring or the combined weight and spring, moves the latch into the notches of the rack. The plunger is also provided with a projecting engaging part 31 which acts when the plunger is up to close the switch 32. There is also a projecting engaging part 33 which acts as the plunger moves up to move brushes 34, 35 and 36 along contacts 37, 38 and 39. The contact 38 is longer than contacts 37 and 39, and there are insulated contacts 40 and 41 at the ends of contacts 37 and 39. The brush holder for the said brushes is guided by the guide rod 42.

Referring now to Figs. 6 and 6ª, a controlling system for two alternating current motors is shown diagrammatically. The three-phase current enters by the conductors 1, 2 and 3. The current then passes through a three-pole service switch 43. Conductor 2 passes directly from said switch to the stator 44 of the main motor 45. Conductors 1 and 3 pass to the overload relays 46 and 47 and thence to the main switches 48, controlled by the main controlling coil 49 which may be a solenoid or an electromagnet of any other description. From switches 48 lead conductors 50 and 51 to the switches 52 (Fig. 6ª) controlled by the coil 53, and from the switches 52 lead conductors 54, 55 to the stator 44 of the motor 45. The three conductors 56, 57 and 58 lead from the rotor 59 of the main motor and connect with the bottom segments of the contacts 10, 10ª and 12. It will be seen that when the plunger 5 is at its maximum up position the resistances 11, 11ª and 13 are in circuit, and that when the plunger descends these resistances are cut out of circuit. Referring to the motor 60, the three phases of the current are connected to the stator 61 of said motor, phase 2 being connected thereto by conductors 2 and 62. Phases 1 and 3 pass through the overload relays 46 and 47, then through switches 48 to the points 63 and 64, and thence by conductors 65 and 66 through the double pole double throw switch 67, thence by conductors 68 and 69 through the overload relays 70 and 71, said conductors then leading to switches 72, the conductors 73 and 74 leading from said switch to the stator 61 of the motor. The three conductors 75, 76 and 77 leading from the rotor 78 are connected respectively to the middle contact of the series of contacts 16, 16ª and 14. The resistances 15, 17 and 17ª are arranged so that the resistance is out of circuit when the contact brushes are on the middle contact, and are gradually cut into circuit by a movement of the brushes in either direction from the middle contact. When the brushes are at the top the resistances are in circuit with the motor. When the brushes are moved downwardly the resistance is gradually cut out of circuit, and then gradually inserted into the circuit. A series of electromagnetic devices, preferably in the form of solenoids, are used in controlling the various circuits. As herein shown these solenoids or coils have but one phase of the current passing through them. The switches 48 make and break the circuit passing to the stators of both motors, and when open, stop both motors. These switches must be closed to start either motor. The switches 48 are controlled by the main coil 49. The coil 49 is connected through resistance 80, conductor 81 and conductor 82 with phase 2 of the current. The other terminal of the coil is connected by conductor 83 with switch 84, associated with overload relay magnets 70 and 71, and by conductor 85 with switch 86, associated with overload relay magnets 46 and 47, and by conductor 87 with switch 88, associated with the stop coil 89, and by conductors 90 and 91 with conductor 3, and hence phase 3 of the current. The core of coil 49 actuates a switch 92 which connects two contacts one associated with the conductor 81, and the other with the conductor 93 which leads to a switch 94 on the plunger 5, associated with the main solenoid 4. A conductor 95 leads from one terminal of said switch to the lower end of resistance 80. The switch 94 is closed when the plunger reaches the top of its movement, and this switch short circuits the resistance 80, thus causing the core of the main coil 49 to be drawn up. This core again inserts the resistance 80 in circuit by breaking the short circuit by opening switch 92. One terminal of the on coil 30 is connected by conductor 96 to the on push buttons or switches 97 through the safety switches 97ª, which are closed when it is desired to start the motors, but which may be opened to prevent the starting of the apparatus. The other terminal of the on coil is connected by conductor 98 with conductor 1, and hence phase 1 of the current. The on buttons 97 are connected by the push button main or conductor 100 with conductor 2, and hence phase 2 of the current. There may be any number of on push buttons or switches 97 located at a number of different but convenient points, and they are connected together so that when any one of them is operated to close the circuit the circuit will be closed through the on coil 30 by means of the conductors enumerated. This coil will attract its core and disengage the pawl or latch associated therewith from the rack on the plunger 5 of the controlling solenoid 4, and permit the plunger of said solenoid to descend. When the plunger descends one notch the brush 36 makes contact with the contact 39, connecting it to contact 38 through the brush holder 38ª and the brush 35. This energizes the small motor switch coil 101, the circuit being as follows: from phase 1 through conductor 98 connected to conductor 1, thence by conductor 102 to contact 38, thence through brush holder 38ª, contact 39, conductor 103, and thence through switch 104 which short circuits resistance 105 to small motor switch coil 101, thence by conductors 106 and 51, switch 48 and conductor 3 to phase 3. The core of the main coil 49 is up under these conditions so as to complete the circuit. The core of coil 101 is now drawn up so as to close switch 72 and close the circuit through the small motor. This motor is then started up. As the core of coil 101 moves upward, it lifts switch 104 and the current then has to pass through resistance 105. This lessens the current through the coil, there being enough to hold the core up, but not enough to draw it up. The resistance is now in the circuit of the small motor. If it is desired to speed up this motor, the on switch may be held closed or may be repeatedly closed, causing the plunger to descend to cut resistance out of the small motor circuit. The small motor reaches full speed when the brushes reach the middle contact of contacts 14, 16 and 16ª. The printing press or other machine is now driven at a comparatively slow rate of speed so that the paper can be threaded therethrough, or any other operation performed where slow speed is desirable. Or, if there is nothing of this nature to be done, the heavy press is gradually started so that it can be easily taken up by the large motor and brought to the required speed. When the center or middle contacts are reached, or at any other suitable time, the brush 34 reaches the contact 37 and the circuit is completed through the large motor switch coil 53. The circuit through this coil is as follows: from phase 1 at conductor 1 through conductor 98, conductor 102 to contact 38, thence through brush holder 38ª and brush 34 to contact 37, thence by conductor 107 through switch 108 which short circuits resistance 109, thence through coil 53 and thence through conductors 106 and 51 and switch 48 and conductor 3 to phase 3. The coil 53 then lifts its core and closes switch 52, closing the circuit through the large motor. When the core reaches the limit of its upward movement it opens switch 108, causing the current to go through resistance 109, thus lessening the current through the coil to a current sufficient to hold up the core, but not to pull it up. By means of an automatic clutch the large motor is brought into driving connection with the printing press or other machinery to be driven, and takes the load so as to bring the mechanism to proper speed. The plunger descending cuts resistance out of the large motor circuit so as to bring it up to speed. During the downward movement of the plunger the resistance of the small motor is cut into circuit again, such resistance being inserted as the brushes which control it move below the middle contact of the contacts 14, 16 and 16ª. This gradually slows down the small motor. After the resistance is all cut in circuit, the brush 36 leaves the contact 39, thus breaking the circuit through the small motor switch coil 101. The core of this coil then drops, opening switches 72 and hence opening the circuit through the small motor and stopping it. The large motor now drives the mechanism. If, now, it is desired to decrease the speed of the motor, one of the off buttons or switches 110 is operated. This closes a circuit starting from phase 2 at conductor 2, then through conductor 100, and then across the switch 110 to conductor 111, thence through the off coil 112, thence through conductor 98 to conductor 1, and hence phase 1. The coil 112 then draws up its core and closes the switches 113. There are three of these switches, one for each phase of the current. These switches close the circuit through the controlling solenoid 4. The three switches are connected to the three phases of the current in conductors 1, 2 and 3 by conductors 98, 82 and 91. These switches are connected with the coils 1ª, 2ª, 3ª of the solenoid by the conductors 116, 115 and 114. It will be seen that the controlling solenoid is operated by the three phases of the current. Any desired number of coils may be used. The coils containing the different phases are all connected together in any desired manner, as by having the conductors connected at the point 117. The controlling solenoid is now energized and gradually moves up, the plunger 5 cutting resistance into the large motor circuit, gradually slowing it down. By opening the off push button or switch the plunger may be stopped at any intermediate position. If it is desired to gradually stop the apparatus, this off switch or button 110 is kept closed, and the plunger then continues to move up, cutting resistance into the circuit of the large motor. As the plunger moves up the brush 36 engages contact 39 cutting coil 101 in circuit and starting the small motor. A further upward movement cuts more resistance into the large motor and cuts resistance out of the circuit of the small motor. When the brushes of the small motor resistance reach the middle contact, or the point where it is desired to cut out the large motor, the brush 34 leaves contact 37, thus breaking the circuit through coil 53 the core of which drops and opens switches 52, thus shutting down the large motor. The further upward movement of the core cuts resistance into the small motor circuit. As it nears the upward limit of its movement the brush 36 leaves contact 39, thus breaking the circuit through coil 101, the core of which drops opening switches 72, thus shutting down the small motor.

To stop the motors quickly at any speed at which they may be operating, for cases of emergency, for example, one of the stop switches or buttons 118 is closed. This closes the circuit through the stop coil 89, traced as follows: from phase 2 through conductor 82 and conductor 100 to switch or button 118, then across said switch to conductor 119, thence to coil 89, thence by conductors 120, 102 and 98 to conductor 1 and hence phase 1. Coil 89 then draws up its core and moves switch 88 so as to break the circuit through main coil 49. The core of coil 49 then drops, opening switches 48 and breaking the main circuit so as to at once stop either motor that may be operating, or both motors if they are both running. At the same time switch 121 closes the circuit through the magnetic brake 122 of the large motor. When the core of the coil 49 drops the switch 92 is closed, which switch closes the circuit through coil 112, the circuit being as follows: from phase 2 through conductor 82 to point 123, thence through conductor 81 and switch 92, thence through conductor 124 and conductor 111 to coil 112, thence by conductor 98 to conductor 1 and hence phase 1. The coil 112 now draws up its core and completes the circuit through the controlling solenoid 4, causing it to draw up its plunger so as to bring the parts in their starting position. When an overload occurs on the large motor the relays 46 and 47 open the switch 86, breaking the circuit through the main coil 49 and stopping the motors, and bringing the controlling solenoid to the starting position as heretofore explained. The same result is produced if an overload occurs on the small motor. In that event, the overload relays 70 and 71 open switch 84 so as to open the circuit through coil 49. When the reversing switch 67 is reversed, it reverses two of the stator leads to the small motor, thus reversing its direction of rotation. In the drawing there is shown two strips of magnetic material associated with the plunger 5 of the controlling solenoid, but it is of course evident that any number of these strips could be used, or even a single strip if desired. The sheath 19 of the core or plunger may be of non-magnetic material, as stated, although it may also be made of magnetic material. It must, however, be an electric conductor. It will be noted that the solenoid herein shown consists of a reciprocating conductor with a circuit varying device controlled thereby and a plurality of alternating current coils disposed along said reciprocating conductor and adapted to set up magnetism therein and produce a longitudinal movement of the conductor. As shown in the drawing, the reciprocating conductor controls a series of resistances, but it is of course evident that it might control any other circuit varying device.

In the specification the word "resistance" has been used in its broad sense to include any form of resistance electrical current, such as dead resistance, impedance and the like.

One of the advantages in using the particular dominant or master controller illustrated in the drawings is that it takes a small amount of current and is therefore more efficient than would be some other form which might be used. This particular form of master controller also facilitates the application thereto of means for holding it in any desired intermediate position as is done in the instance illustrated by means of the coil 30, rack 28 and latch 29.

When two motors are used, as shown, for example, in Figs. 6 and 6ª, the motors are connected to the printing press or other machinery to be operated in any desired manner, but they are preferably connected so that there is an automatic clutch associated with the small motor arranged so that when the speed of the large motor becomes greater than that of the small motor, the small motor will be automatically disconnected.

We claim:

1. A controller for alternating current motors comprising a series of contacts with resistances associated therewith, a movable contact device adapted to be moved therealong, a plunger connected therewith, a series of coils associated with said plunger, there being separate coils for the different phases of the current, the number of coils being greater than the number of phases of the current, said coils arranged so as to cause the plunger to move the contact device along said contacts to vary the resistance in the circuit.

2. An alternating current solenoid comprising a plurality of strips of magnetic material, a core located between them, separate coils for different phases of the current located in proximity to said strips and core, and means for holding said core in any desired intermediate position.

3. An alternating current solenoid comprising a plurality of strips of magnetic material, a core located between them, separate coils for different phases of the current located in proximity to said strips and core, and circuit varying devices at opposite ends of the core controlled by said core.

4. An alternating current solenoid comprising a core, a conducting sheath therefor, a strip of magnetic material in proximity to said core, windings associated with said core and strip so as to produce magnetism in said core, a contact device connected with said core, a series of contacts over which said contact device moves, resistances between said contacts, means for holding said core in any desired intermediate position, the core adapted to drop by gravity in cutting resistance out of the circuit.

5. An alternating current solenoid comprising a core, a conducting sheath therefor, a strip of magnetic material in proximity to said core, windings associated with said core and strip so as to produce magnetism in said core, a contact device connected with said core, a series of contacts over which said contact device moves, resistances between said contacts, means for holding said core in any desired intermediate position.

6. The combination with a plurality of windings, each acting as the conductor for one phase of a polyphase alternating current, said windings greater in number than the phases of the current, of a reciprocating conductor associated with said windings and adapted to be moved therealong by the magnetic force developed by the current in said windings.

7. An alternating current solenoid, comprising a reciprocating electrical conductor, a circuit varying device controlled thereby, and a plurality of alternating current coils for each phase of the current disposed along said conductor and adapted to set up magnetism therein so as to produce a longitudinal movement of the conductor.

8. A controlling device for alternating current motors, comprising a controller associated with the motor, means operated by an alternating current for actuating said controller, and a device at a distant point for controlling said means and a device for holding said controller at any desired intermediate position.

9. A controlling device for a plurality of alternating current motors adapted to be operated from a distant point, comprising an initial controlling device at a distant point, a series of actuating parts, alternating current actuating devices therefor, adapted to be successively brought into action, when the device at a distant point is operated, and successively start said motors.

10. The combination with a plurality of alternating current motors of a controlling device, comprising a series of actuating parts, actuating devices therefor operated by an alternating current, and a master controller operated by an alternating current adapted to control said actuating devices so as to bring them successively into action.

11. A system of control for alternating current motors, comprising an alternating current master controller, a series of alternating current actuating devices adapted to control the circuit of the motors, and means associated with said alternating current master controller for successively bringing said alternating current actuating devices into operation to successively start the motors.

12. A system of control for alternating current motors, comprising an alternating current master controller, a series of alternating current actuating devices adapted to control the circuit of the motors, means associated with said alternating current master controller for successively bringing said alternating current actuating devices into operation to successively start the motors, and means for controlling said alternating current master controller from a distant point.

13. A system of control for alternating current motors, comprising an alternating current master controller provided with a reciprocating part, a series of alternating current actuating devices for controlling the circuit of said motors, circuits for said alternating current actuating devices arranged so that the reciprocating part of said alternating current master controller when moved successively brings them into action to successively start the motors.

14. A system of control for alternating current motors, comprising a master alternating current solenoid, a reciprocating part therefor, resistance controlling devices for the motors actuated by said reciprocating part, a series of alternating current actuating devices for controlling the circuits through the motors, means associated with the reciprocating part of said alternating current solenoid for controlling the circuit through said alternating current actuating devices so as to successively start said motors.

15. A controlling device for a plurality of alternating current motors adapted to be operated from a distant point, comprising an initial controlling device at a distant point, a series of actuating parts, alternating current actuating devices therefor adapted to be brought into action when the device at a distant point is operated.

16. The combination with a plurality of alternating current motors of a controlling device comprising a series of actuating parts, actuating devices therefor, and an automatic master controller adapted to control said actuating devices so as to bring said motors successively into action.

17. The combination with a plurality of alternating current motors of a controlling device, comprising a series of actuating parts, actuating devices therefor, an automatic master controller having a movable part adapted to control said actuating devices so as to bring said motors successively into action, and means for holding the movable part of said master controller in any desired position intermediate its maximum and minimum positions.

18. The combination with a plurality of alternating current motors of a controlling device, comprising a series of actuating parts, actuating devices therefor, an automatic master controller having a movable part adapted to control said actuating devices so as to bring said motors successively into action, and means controlled by an alternating current for holding the movable part of said master controller in any desired position intermediate its maximum and minimum positions.

19. An alternating current solenoid, comprising a core, a conducting sheath therefor, a strip of magnetic material in proximity to said core, windings associated with said core and strip so as to produce magnetism in said core when an alternating current is sent through said windings, and means for holding said core in an intermediate position.

CHARLES A. DRESSER.
HARLAND FANKBONER.

Witnesses:
MINNIE M. LINDENAU,
EDNA K. REYNOLDS.